Patented Feb. 24, 1953

2,629,743

UNITED STATES PATENT OFFICE 2,629,743

POLYGLYCOL ETHERS OF ALKYL PHENOL SULFIDES

Llewellyn W. Burnette, Easton, Pa., and James M. Cross, Washington, N. J., assignors to General Aniline & Film Corporation, New York, N. Y., a corporation of Delaware No Drawing. Application November 14, 1947, Serial No. 786,140

12 Claims. (Cl. 260—608)

1

This invention relates to a novel nonionic surface-active agent obtained by condensing an alkylene oxide with an alkyl phenol sulfide or a polymer thereof.

These novel nonionic surface-active agents may be represented by the following general formula:

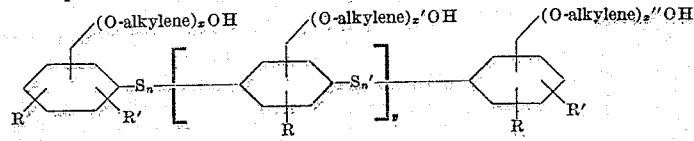

wherein the R's stand for alkyl groups and the R's stand for hydrogen or, if $y$ is zero may stand for alkyl groups, the total number of alkyl carbon atoms in the groups R and R' in any one benzene nucleus being from 6–18 and preferably 8–12; $n$ and $n'$ stand for integers of from 1–4 (generally 1 or 2); $y$ stands for an integer (including zero) of less than 5; and $x$ is an integer. These novel nonionic surface-active agents, in which the number of alkylene oxide units is sufficient to impart water-solubility thereto, possess many desired surface-active properties (i. e. good detergency, wetting and emulsifying properties).

These novel nonionic surface-active agents may be prepared by condensing, preferably in the presence of an alkali, a lower alkylene oxide or a preformed polyalkylene oxide glycol ether with an alkyl phenol sulfide or a polymer thereof.

The alkyl phenol sulfides which may be employed in producing the novel nonionic surface-active agents of the present invention and polymers thereof may be readily produced by reacting an alkyl phenol with sulfur dichloride at a temperature between 60° and 140° C. in an inert solvent boiling at the reaction temperature (preferably an inert organic halide solvent). These phenol sulfides are well known in the art and suitable procedures for their production are described, for example, in U. S. Patent No. 2,139,321 to Mikeska and No. 2,207,719 to Cohen and Mikeska, while the higher reaction products, particularly the dimers and trimers of phenol sulfides as well as the method of their preparation, are disclosed in U. S. Patent No. 2,239,534 to Mikeska and Lieber. In order to obtain the most desirable properties in the products of the present invention, it is desirable to employ the phenol sulfides obtained from phenols containing at least six carbon atoms in the alkyl group or groups. As examples of suitable phenols for use in producing the phenol sulfides employed in making the nonionic surface-active agents of the present invention may be mentioned such phenols as ditertiary butyl phenol, di-isopropyl phenol, diamyl phenol, iso-octyl phenol, dodecyl phenol, octadecyl phenol and the like, and also the mixed alkyl phenols obtained by condensing olefines having from 6 to 12 or more carbon atoms with phenol, such as mixed $C_9$–$C_{12}$ olefines obtained from petroleum refining.

The alkyl phenol sulfides employed in the production of the novel nonionic surface-active agents of this invention need not be highly purified, but if desired, the crude alkyl phenol sulfides containing some unreacted phenol and consisting of a mixture of alkyl phenol mono- and disulfides and also higher reaction products may be employed, if desired.

The novel polyglycol ethers of alkyl phenol sulfides may be prepared by procedures commonly employed in the art for adding a polyglycol ether group to organic hydroxy compounds; for instance, in the manner described in U. S. Patents Nos. 1,970,578 and 2,213,477, by heating the alkyl phenol polysulfide in the presence of a small amount of an alkali with an alkylene oxide, such as ethylene oxide, propylene oxide or butylene oxide, and continuing the introduction of the alkylene oxide until a water-soluble product is obtained or by reacting the alkyl phenol polysulfide with a preformed polyglycol ether having a sufficient number of alkylene oxide groups to impart water solubility to the final product. The number of alkylene oxide units which must be incorporated in the alkyl phenol sulfide in order to solubilize the same will vary with the particular alkyl phenol sulfide or mixture thereof which is employed and the specific solubility characteristics desired in the final product. However, as a rough rule of thumb, optimum solubility characteristics are obtained in the product when, for each mol of alkyl phenol sulfide, from .5 to 1 mol of alkylene oxide per carbon atom in the alkyl phenol sulfide is employed, and in any event the optimum amount of alkylene oxide groups for any particular application may readily be determined by simple preliminary experiment.

The following specific examples illustrate specific preferred embodiments of the present invention:

Example 1

234 grams of diamyl phenol (1 mol) were dissolved in 500 cc. of ethylene chloride and heated to reflux (80° to 85° C.). 41 grams of sulfur dichloride (0.4 mols) dissolved in 100 cc. of ethylene chloride was then dripped in over a period of 2 hours. The mixture was then heated at reflux for approximately 6 hours, while bubbling air therethrough to remove HCl. The solvent was then removed by distillation at atmospheric pressure, leaving 256 grams of crude alkyl phenol sulfide product.

181 grams of this crude product were then distilled under vacuum and a fraction boiling from 131° to 173° C. at 3.7 millimeters and consisting predominantly of unreacted diamyl phenol was collected. 63.5 grams of a second fraction boiling at 173° to 213° C. at 3.7 millimeter pressure and consisting of diamyl phenol sulfides were collected, leaving a residue of 23 grams of higher boiling products. The distillation loss was 7.5 grams. 50 grams of the second fraction mentioned above (B. P. 173–213° C. at 3.7 mm.) were placed in a reaction vessel and ½ gram of potassium hydroxide added thereto. Ethylene oxide was then introduced until the gain in weight was 123 grams. The thus-obtained product gave a clear solution in water which showed a cloud point at 48° C.

*Example 2*

234 grams (1 mol) of diamyl phenol dissolved in 500 cc. of ethylene chloride were heated at reflux and 54 grams of sulfur dichloride (0.4 mols) dissolved in 100 cc. of ethylene chloride were added over 1.3 hours. Next it was heated with stirring at reflux for an additional 6 hours, while drawing air through the mixture to remove HCl. The solvent was then removed by distillation at atmospheric pressure, leaving 281 grams of a dark viscous product. 272 grams of this product were distilled at 3.5 millimeters to remove unreacted phenol, leaving 157.5 grams of residual product. To 60 grams of this residual product was added ½ gram of potassium hydroxide and ethylene oxide was passed into the mixture until the gain in weight was 200 grams. The thus-obtained product was water-soluble and had a cloud point at 53° C.

*Example 3*

309 grams of iso-octyl (di-isobutyl) phenol dissolved in 800 cc. of ethylene chloride were heated to reflux and 8.5 grams of sulfur dichloride dissolved in 150 cc. of ethylene chloride were slowly added thereto. Air was drawn through the mixture while stirring and heating at reflux for 6 hours after the addition of the sulfur chloride was complete, and the solvent was then removed by distillation. 60 grams of the crude reaction product, after removing the solvent, were reacted with 124 grams of ethylene oxide, using ½ gram of potassium hydroxide as catalyst. The thus-obtained product gave a clear strongly-foaming solution in water which showed a cloud point at 57° C.

*Example 4*

103 grams of iso-octyl (di-isobutyl) phenol (.5 mol) dissolved in 400 cc. of ethylene chloride were heated to reflux and 55 grams of sulfur dichloride (0.4 mol) dissolved in 100 cc. of ethylene chloride were then added during slightly more than an hour. Air was drawn through the mixture for 6 hours after the addition of the sulfur dichloride was complete while stirring and heating to reflux and the solvent was then removed by distillation at atmospheric pressure. 60 grams of the crude product, after removal of the solvent, were reacted with 225 grams of ethylene oxide to yield a water-soluble product.

All the compounds produced in the foregoing examples exhibited good cotton and wool detergency characteristics and were also excellent emulsifying agents. For example, it was found that these products were superior to other known emulsifying agents for emulsifying a mixture consisting of 25% DDT, 65% xylene and 10% emulsifying agent of the type recommended in Miscellaneous Publication No. 606, U. S. Department of Agriculture, page 16.

We claim:

1. A water-soluble nonionic surface-active polyglycol ether of an alkyl phenol sulfide containing 6 to 18 alkyl carbon atoms in each benzene nucleus and in which the number of alkenoxy groups in the polyglycol ether radicals corresponds substantially to 0.5 to 1.0 times the number of said alkyl carbon atoms.

2. A water-soluble nonionic surface-active polyglycol ether of an alkyl phenol monosulfide containing 6 to 18 alkyl carbon atoms in each benzene nucleus and in which the number of alkenoxy groups in the polyglycol ether radicals corresponds substantially to 0.5 to 1.0 times the number of said alkyl carbon atoms.

3. A water-soluble nonionic surface-active polyglycol ether of an alkyl phenol disulfide containing 6 to 18 alkyl carbon atoms in each benzene nucleus and in which the number of alkenoxy groups in the polyglycol ether radicals corresponds substantially to 0.5 to 1.0 times the number of said alkyl carbon atoms.

4. A composition as defined in claim 1, wherein the number of alkyl carbon atoms in each benzene nucleus is between 8 and 12.

5. A composition as defined in claim 2, wherein the number of alkyl carbon atoms in each benzene nucleus is between 8 and 12.

6. A composition as defined in claim 3, wherein the number of alkyl carbon atoms in each benzene nucleus is between 8 and 12.

7. A composition as defined in claim 1, wherein said alkyl phenol sulfide is a diamyl phenol sulfide.

8. A composition as defined in claim 2, wherein said alkyl phenol monosulfide is diamyl phenol monosulfide.

9. A composition as defined in claim 3, wherein said alkyl phenol disulfide is diamyl phenol disulfide.

10. A composition as defined in claim 1, wherein said alkyl phenol sulfide is an iso-octyl phenol sulfide.

11. A composition as defined in claim 2, wherein said alkyl phenol monosulfide is iso-octyl phenol monosulfide.

12. A composition as defined in claim 3, wherein said alkyl phenol disulfide is iso-octyl phenol disulfide.

LLEWELLYN W. BURNETTE.
JAMES M. CROSS.

REFERENCES CITED

The following references are of record in the file of this patent:

UNITED STATES PATENTS

| Number | Name | Date |
|---|---|---|
| 2,212,477 | Steindorff et al. | Sept. 3, 1940 |
| 2,299,213 | Cooke et al. | Oct. 20, 1942 |
| 2,306,354 | Cook et al. | Dec. 22, 1942 |
| 2,499,366 | De Groote et al. | Mar. 7, 1950 |

FOREIGN PATENTS

| Number | Country | Date |
|---|---|---|
| 794,830 | France | Dec. 26, 1935 |